(12) United States Patent
Robinson

(10) Patent No.: X1086
(45) Date of Patent: Jun. 27, 1809

(54) BUTTONS, SECURING INA LATHE

(76) Inventor: George W. Robinson

The schedule referred to in these Letters Patent and making part of the same, containing a description in the words of the said George W. Robinson himself of his mode of securing a button in a lathe for turning by two springs The springs are firmly attached to the chuck or screw piece which screws on to the mandrill. At the end of the spring pieces so that when they are fastened to the chuck, is a shoulder on each spring projecting inwards, which shoulders have an [illegible] made in them suitable for receiving the eye. A little distance back of these shoulders are two other shoulders projecting both of which together with those in the end of the springs shut down into a mortice made thro the chuck or screw-piece and a nut oval in the middle with a head like a thumb screw, is placed in the centre between the two springs thro the chuck. The nut when turned one way bears upon the second described shoulders or projections on the spring pieces, the springs apart ready to receive the eye of the button.

The eye of the button is put thro a small orifice made in the end of the chuck or screw piece large enough to receive it, then the oval nut being turned back so that it lies flat ways with the springs, the springs force themselves down closing the two first described shoulders down fast on each edge [illegible] of the eye, nigh the root of the root of the eye, holding the button firm to the face of the chuck or screw-piece which secures the button fast in the lathe for turning.

Witnesses
Obadiah Brown
Gideon Thornton

George W. Robinson

Recorded and examined the 17. Dec. 1831.
[illegible]